(12) United States Patent
Hsieh et al.

(10) Patent No.: US 8,752,060 B2
(45) Date of Patent: Jun. 10, 2014

(54) MULTI-CPU DOMAIN MOBILE ELECTRONIC DEVICE AND OPERATION METHOD THEREOF

(75) Inventors: Cheng-Hsueh Hsieh, Hsinchu Hsien (TW); Kuo-Chuan Huang, Hsinchu Hsien (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 159 days.

(21) Appl. No.: 13/043,084

(22) Filed: Mar. 8, 2011

(65) Prior Publication Data
US 2012/0017219 A1    Jan. 19, 2012

(30) Foreign Application Priority Data
Jul. 16, 2010 (TW) .............................. 99123452 A (51) Int. Cl.
*G06F 9/46*    (2006.01)
(52) U.S. Cl.
USPC .......................................... 718/104; 719/314

(58) Field of Classification Search
USPC .......................................... 719/314; 718/104
See application file for complete search history.

(56) References Cited

U.S. PATENT DOCUMENTS

| | | | |
|---|---|---|---|
| 2004/0205773 A1* | 10/2004 | Carcido et al. | 719/318 |
| 2006/0069853 A1* | 3/2006 | Beckert et al. | 711/104 |
| 2007/0083871 A1* | 4/2007 | McKenney | 718/105 |
| 2010/0005474 A1* | 1/2010 | Sprangle et al. | 718/104 |
| 2010/0049960 A1* | 2/2010 | Okamoto et al. | 713/1 |
| 2011/0173622 A1* | 7/2011 | Shin et al. | 718/102 |

* cited by examiner

*Primary Examiner* — Emerson Puente
*Assistant Examiner* — Steven Do
(74) *Attorney, Agent, or Firm* — WPAT, PC; Justin King (57) ABSTRACT

A multi-CPU domain mobile electronic device, includes: a first CPU domain, comprising at least a first migration agent unit, the first migration agent unit detecting a task migration condition, determining whether to migrate a migratable task, and sending an associated migration event, and a second CPU domain, comprising at least a second migration agent unit, the second migration agent unit receiving the migratable task from the first migration agent unit.

10 Claims, 6 Drawing Sheets

MULTI-CPU DOMAIN MOBILE ELECTRONIC DEVICE AND OPERATION METHOD THEREOF

CROSS REFERENCE TO RELATED PATENT APPLICATION

This patent application is based on a Taiwan, R.O.C. patent application No. 099123452 filed on Jul. 16, 2010.

FIELD OF THE INVENTION

The present invention relates to a multi-CPU domain mobile electronic device and method thereof, and more particularly, to a mobile electronic device having multi-CPU domain control for balancing power consumption and performance and method thereof.

BACKGROUND OF THE INVENTION

Current mobile electronic devices, such as mobile phones or portable multimedia players (PMP), may include two or more central processing units (CPUs) with possibly different frequencies, performance and power consumptions.

Conventionally, in order to perform load balancing between multiple CPUs, a task migration is executed when a particular CPU is overloaded or in an idle state; however, a communication failure may exist between CPUs, for example, if the CPUs used have different real-time operation systems (RTOS) or if the CPUs are made by different manufacturers.

SUMMARY OF THE INVENTION

Therefore, the present disclosure presents a multi-CPU domain electronic device and method thereof. According to dynamic performance requirements or some other conditions, a task may be migrated between different CPU domains for balancing between performance and power consumption.

A multi-CPU domain mobile electronic device, includes: a first CPU domain, comprising at least a first migration agent unit, the first migration agent unit determining whether to migrate a migratable task and sending a migration event to an event queue, and a second CPU domain, comprising at least a second migration agent unit, the second migration agent receiving the migratable task from the first migration agent unit.

A multi-CPU domain mobile electronic device operation method is also described, including a first task migration agent unit detecting a task migration condition, when a first task migration agent unit determines a task migration is needed, the first task migration agent unit decides to migrate migratable tasks from a first CPU domain to a second CPU domain, the first migration agent unit sends out migration events to an event queue, a second migration agent unit is informed that the migration events are awaiting to be executed, and after the second migration agent unit receives the migration event, the second CPU domain executes the migratable task, completing task migration.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

The present disclosure discloses a mobile electronic device as an embodiment of the present invention. The mobile electronic device comprises multiple CPU domains and each of the domains includes at least one CPU. One of the CPU domains may be a high efficiency high power CPU domain while another may be a low efficiency low power CPU domain. Furthermore, some common hardware resources, such as system memories, interrupts, or hardware intellectual properties, which are functional blocks written in RTL code, may be shared by different CPU domains concurrently. In addition, according to dynamic performance requirements or some other conditions, tasks may be migrated between different CPUs to balance power consumption and performance of the device.

Figure 1:
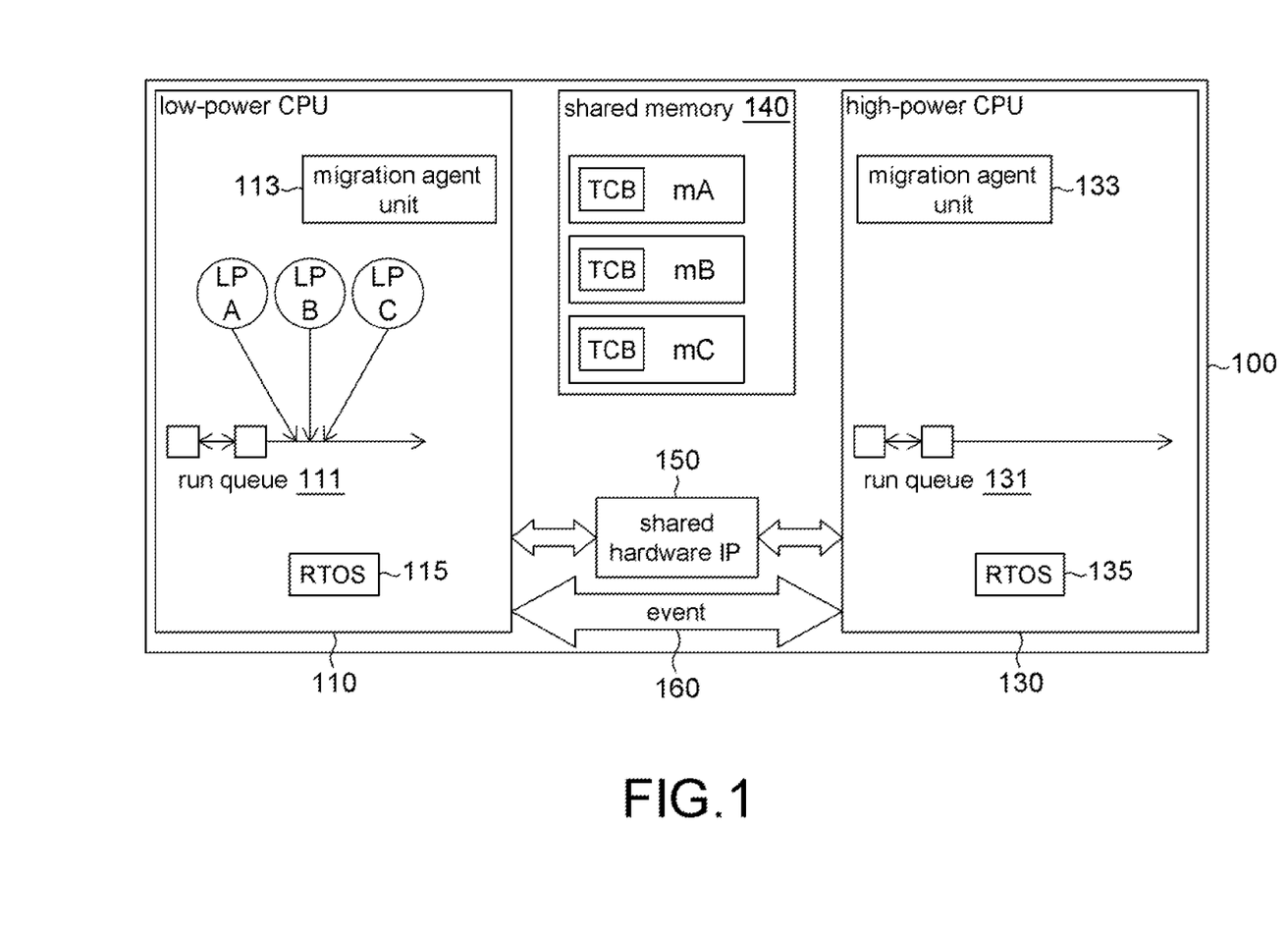
FIG. 1 is a block diagram of a mobile electronic device according to an embodiment the present disclosure.

FIG. 1 is a block diagram of a mobile electronic device according to an embodiment of the present disclosure. As shown in FIG. 1, the mobile electronic device 100 comprises a low-power CPU 110, a high-power CPU 130, a shared memory 140, a shared interrupt and shared hardware IP 150, and an event queue 160. The mobile electronic device 100 may be a mobile phone or a portable media player, but is not limited to these devices. Furthermore, the low-power CPU 110 is in the low efficiency low power CPU domain while the high-power CPU 130 is in the high efficiency high power CPU domain. In addition, although the present embodiment uses merely two CPUs of different power for illustration, please note that the electronic device disclosed in the present disclosure may comprise more CPU domains and those CPU domains may have different performance and power consumptions in other possible embodiments.

The low-power CPU 110 comprises a run queue 111, a migration agent unit 113, and a RTOS (Real-time operating system) 115 executed on the low-power CPU 110. Similarly, a high-power CPU 130 comprises a run queue 131, a migration agent unit 133, and a RTOS 135 executed on the high-power CPU 130. The shared memory 140 and the shared interrupt and shared hardware IP 150 are shared by the CPU 110 and the CPU 130. During a task migration, the migration agent unit of one of the CPU triggers an event on the event queue 160, and then the migration agent unit of the other CPU will detect the event and start the task migration process.

After the mobile electronic device 100 is booted, the low-power CPU 110 stays constantly in a normal operation mode, and if a task is generated, the low-power CPU 110 starts executing the task. After the device is booted, the high-power CPU 130 enters into a power-saving mode. An example is as follows.

When users are executing low-loading tasks, such as web browsing, the low-loading tasks are first executed by the low-power CPU 110 (i.e., similar low-loading web browsing tasks will be put in the run queue 111 of the low-power CPU 110).

However, when users are executing high-loading tasks, such as playing videos, playing games, executing global positioning, or photographing, executing these high-loading tasks consumes much CPU resources and greatly increases the load of the low-power CPU 110. Therefore, in the present embodiment, executing these high-loading tasks triggers a task migration mechanism, initiates (wakes up) the high-loading CPU 130, and migrates these high-loading tasks to the high-power CPU 130 (i.e., these high-loading tasks will be put in the run queue 131 of the high-loading CPU 130), so as to meet higher performance requirements required by processing demand.

Following that, if the load of the high-power CPU 130 later reduces and that the low-power CPU 110 is capable of executing the tasks in the high-power CPU 130, the tasks in the high-power CPU 130 are migrated back to the low-power CPU 110, and the high-power CPU 130 again enters into the power-saving mode to reduce power consumption for balancing device power consumption and performance.

In the present embodiment, the RTOS 115 and the RTOS 135 are homogenous. The RTOS in the embodiment of the present disclosure is not limited to a specific type; when comparing to ordinary operating systems, a RTOS generally has lower performance, with less functionality. When migratable tasks are created, the migratable tasks are stored in the shared memory 140, accessable by multiple CPU domains. The migration agent units 113, 133 manage the resources of these migratable tasks (for example, task identification codes, and shared memory management, etc.), and migrate the tasks between the two CPUs 110 and 130.

The migration agent unit 113 (or 133) sends out a migration event to the event queue 160, enabling the other migration agent unit 133 (or 113) to receive this event. The migration event may include: a hardware message queue, an event interrupt, a software message queue, etc. Although in the present embodiment, the migration agent unit 113, 133 are implemented in software, but in other embodiments, the migration agent unit 113, 133 may also be implemented in hardware or a combination of hardware and software. Furthermore, the migration agent units 113, 133 may also switch the CPUs 100, 130 to be on or off.

In addition, before a task migration, the migration agent units 113, 133 set the status of an event to be migratable. The migration agent unit 113 (or 133) then sends out the migration event, and the other migration agent unit 133 (or 113) receives the migration event. The migration agent unit 133 (or 133) removes the migratable task from the run queue 111 (or 131) corresponding to the CPU 110 (or 130) which the task is currently assigned to, and the other migration agent unit 133 (or 113) then adds the task into the run queue corresponding to the newly assigned CPU 130 (or 110).

In FIG. 1, tasks mA, mB, and mC are migratable, while tasks LP A, LP B, and LP C are non-migratable, which are always executed by the low-power CPU 110. Each of the migration agent units 113 and 133 in the CPUs 110 and 130 awaits migration events sent from the event queues 111, 131 (such as hardware event queues).

When the mobile electronic device 100 boots, the low-power CPU 110 and the high-power CPU 130 may boot independently, potentially running concurrently or sequentially.

Figure 2:
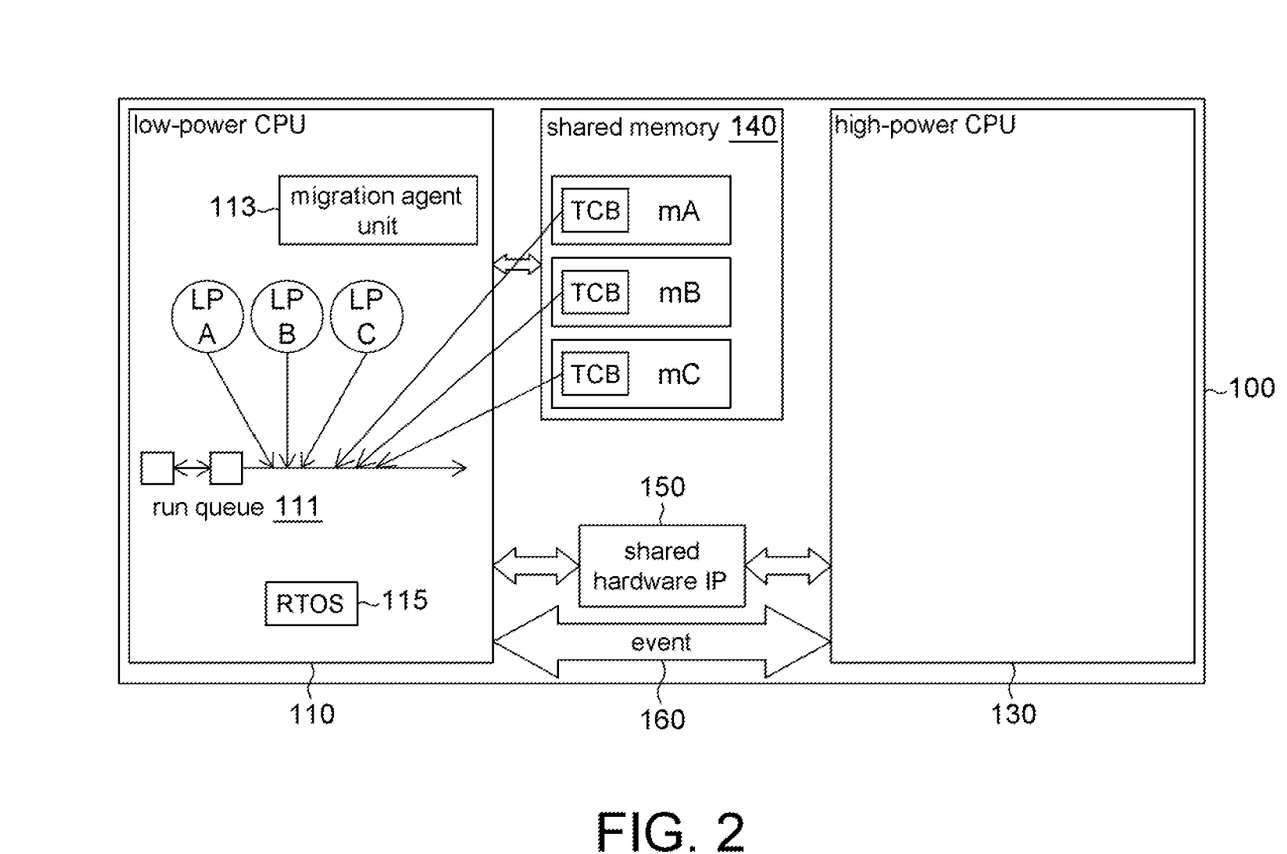
FIG. 2 is a block diagram of the mobile electronic device in FIG. 1, when all tasks are temporarily executed in the low-power CPU, after booting, according to an embodiment of the present disclosure.

As shown in FIG. 2, after the mobile electronic device 100 is booted, all tasks (i.e., the migratable tasks mA~mC and the non-migratable tasks LP A~LP C) are generated/created and are temporarily/currently assigned to be executed in the low-power CPU 110. Please note that, the high-power CPU 130 in FIG. 2 is temporarily in the power-saving mode; thus, the execution of the RTOS 135 is not illustrated in FIG. 2.

Figure 3:
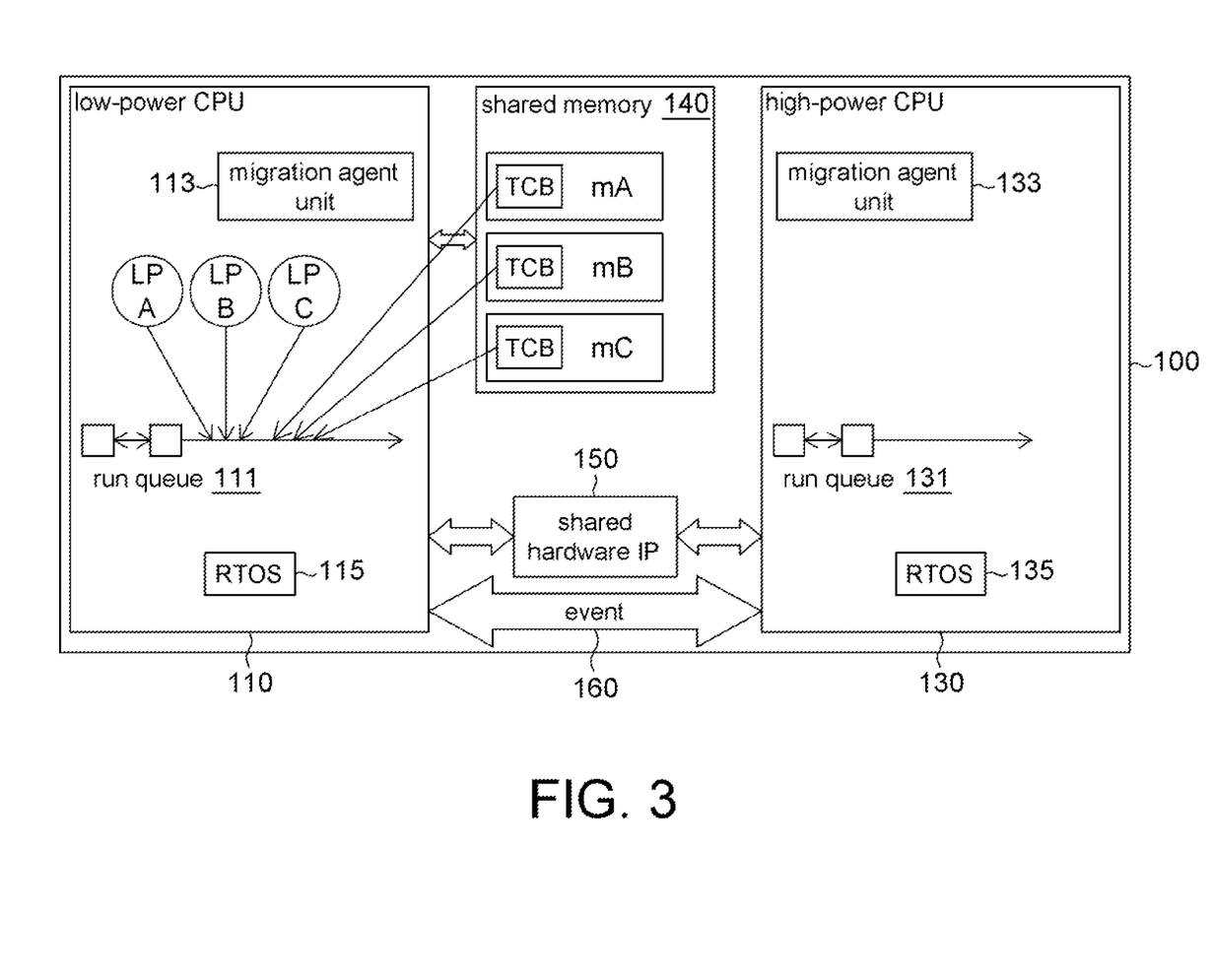
FIG. 3 is a block diagram of the mobile electronic device in FIG. 1, when the high-power CPU is initialized according to an embodiment of the present disclosure.

When a task migration condition is detected by the migration agent unit 113 of the low-power CPU 110, the decision of whether some migratable tasks shall be migrated from the low-power CPU 110 to the high-power CPU 130 will be made. That is, the migration agent unit 113 decides which tasks shall be migrated and when those tasks shall be migrated based on various detection conditions. These detection conditions may include current CPU load, the potential task loading, device battery capacity, CPU temperature, etc. When a task migration is decided, the migration agent unit 113 initiates (wakes up) the high-power CPU 130, currently in the power-saving mode, and the RTOS 135 of the high-power CPU 130, the migration agent unit 133 and the run queue 131 begin to operate in normal operation mode as illustrated in FIG. 3.

Figure 4:
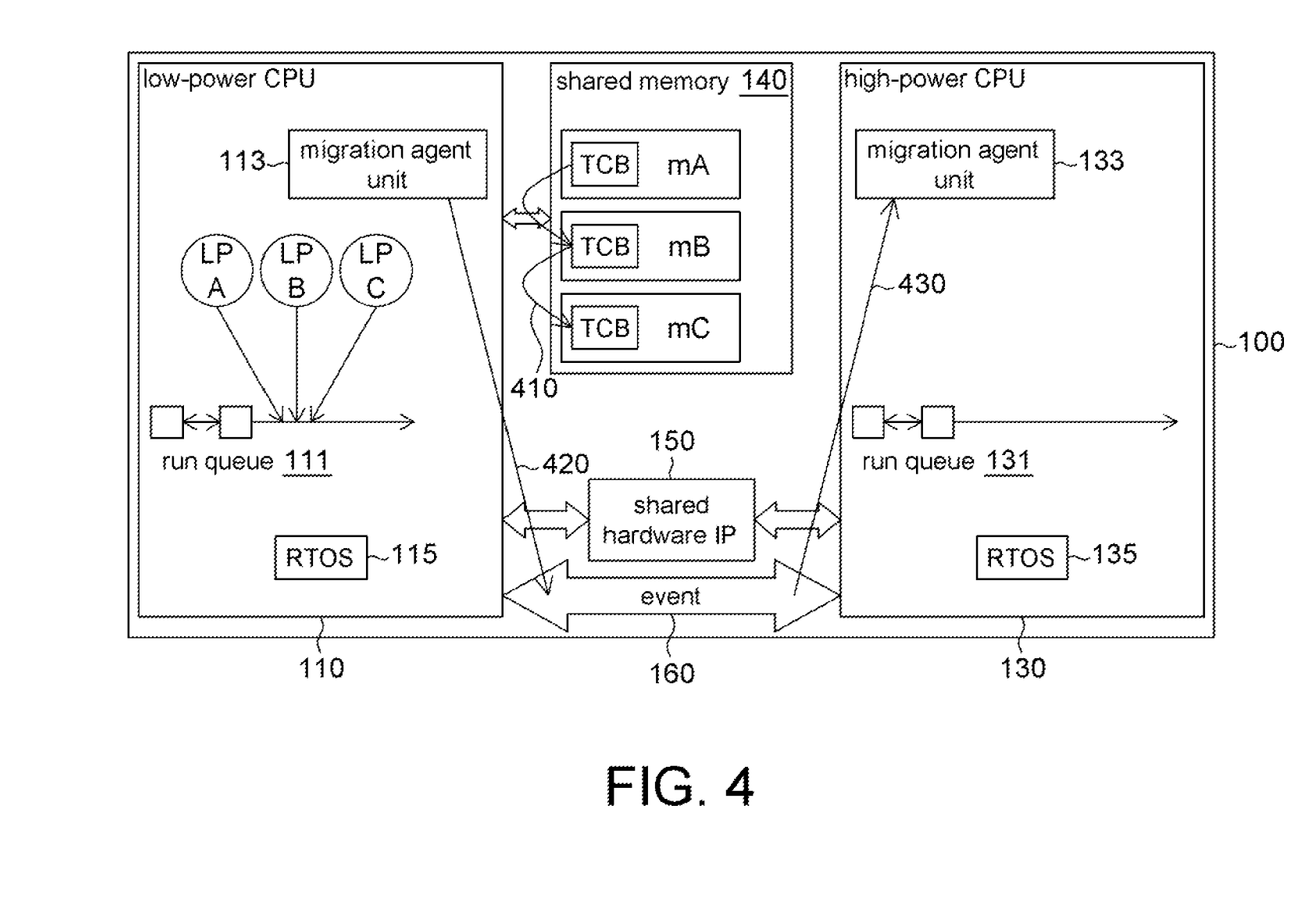
FIG. 4 is a block diagram of the mobile electronic device in FIG. 1 showing a task migration flow according to an embodiment of the present disclosure.

FIG. 4 illustrates a task migration flow according to an embodiment of the present disclosure. The task migration agent 113 of the low-power CPU 110 sends out migration signals to the migratable tasks mA~mC for informing that these migratable tasks are to be migrated to the high-power CPU 130. When the migratable tasks mA~mC originally executed on the low-power CPU 110 receive the migration signals, the migratable tasks mA~mC terminate current operations and change to a migratable state.

After that, the migration agent unit 113 of the low-power CPU 110 removes the migratable tasks mA~mC from the run queue 111 of the RTOS 115, updates a task control block (TCB) of those migratable tasks, and puts the migratable tasks into a migration task list 410 in shared memory, and flushes flash memory if required, etc.

After all required flows are completed, the migration agent unit 113 sends migration events 420 to the event queue 160. The event queue 160 sends out hardware interrupts 430, and an interrupt service routine (ISR) (not shown in FIG. 4) sends informative signals to the migration agent unit 133 of the high-power CPU 130, to inform that there are migration events to be processed. Furthermore, access control of the shared memory 140 is also transferred from the low-power CPU 110 to the high-power CPU 130.

Figure 5:
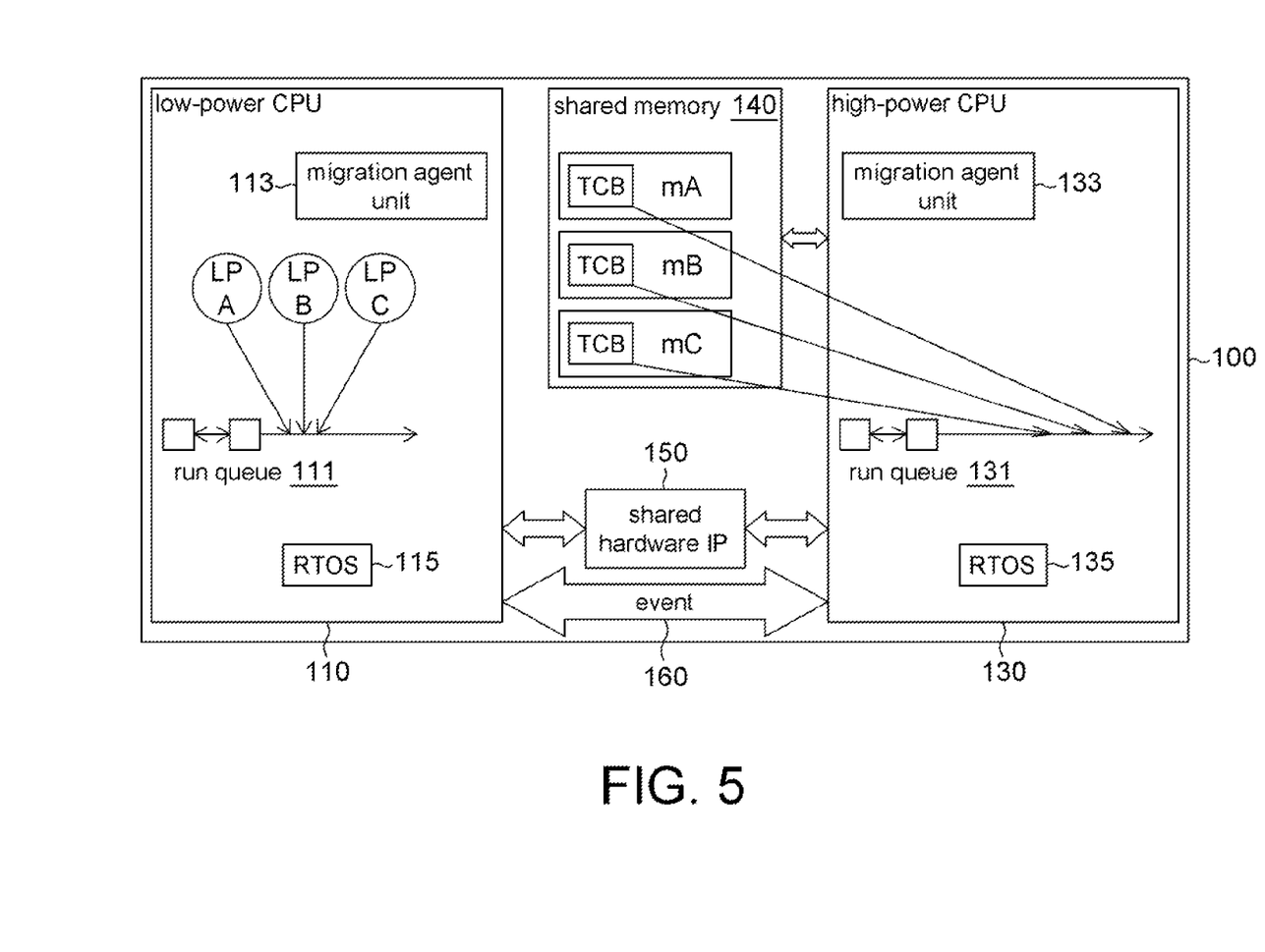
FIG. 5 is a block diagram of high-power CPU processing the tasks after task migration according to an embodiment of the present disclosure.

After receiving the migration events 420, the migration agent unit 133 of the high-power CPU 130 retrieves the migratable tasks mA~mC from the migration task list 410, adds the migratable tasks mA~mC into the run queue 131, and sets up the related shared interrupts and hardware IPs. The RTOS 135 performs scheduling, to execute the migratable tasks mA~mC as depicted in FIG. 5. Please note that, although the migratable tasks mA~mC are migrated from the low-power CPU 110 to the high-power CPU 130, the low-power CPU 110 always stays in a normal operational mode after booting, as described above. Therefore, the tasks LP A~LP C in FIG. 2~FIG. 5, in run queue 111, are still executed by the low-power CPU 110.

Although FIG. 2~FIG. 5 merely depict the steps of migrating tasks from the low-power CPU 110 to the high-power CPU 130, the reverse steps of migrating tasks from the high-power CPU 130 to the low-power CPU 110 is similar and detail descriptions are omitted herein. One discrepancy between the two steps is that after the task migration ended from the high-power CPU 130 to the low-power CPU, the RTOS 135 and the high-power CPU 130 will enter into the power-saving mode, so as to reduce power consumption.

Figure 6:
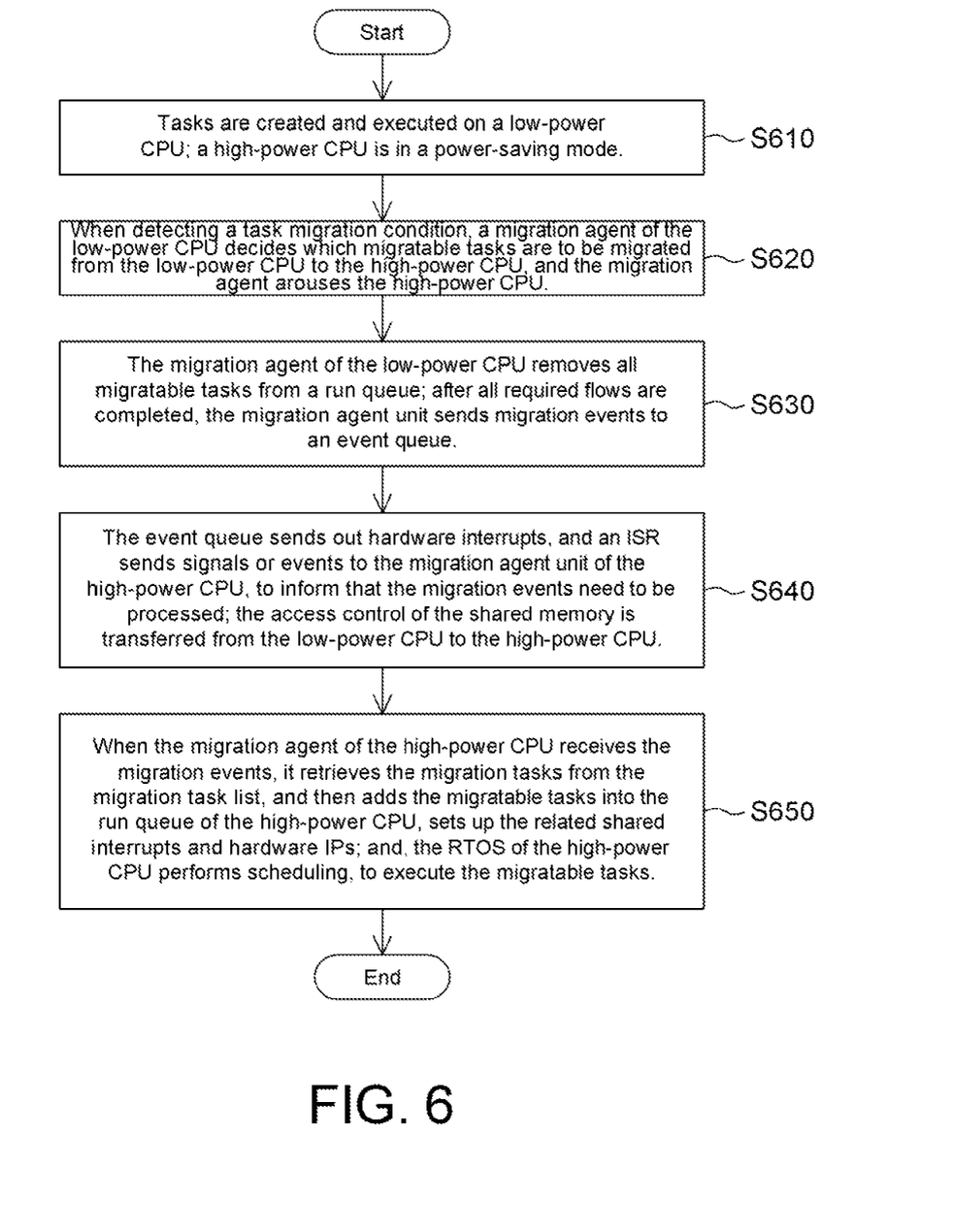
FIG. 6 is a flowchart of the task migration process flow in FIG. 4 according to an embodiment of the present disclosure.

Please refer to FIG. 6, which depicts a task migration flow according to an embodiment of the present disclosure. The tasks (migratable/non-migratable tasks) are created and executed on the low-power CPU 110 of a mobile electronic device after booting in Step S610.

Hence, in Step S620, when detecting a task migration condition, the migration agent unit 113 of the low-power CPU 110 decides which migratable tasks are to be migrated from the low-power CPU 110 to the high-power CPU 130, and the migration agent 113 initiates (wakes up) the high-power CPU 130.

In Step S630, the migration agent unit 113 of the low-power CPU 110 removes all migratable tasks from the run queue 111; after all of the required flows are completed, the migration agent unit 113 sends migration events to the event queue 160. In addition, Step S630 may further include the steps of sending out migration signals by the task migration agent 113 of the low-power CPU 110 to the migratable tasks mA~mC for informing that these migratable tasks are to be migrated to the high-power CPU 130; when the migratable tasks mA~mC original executed on the low-power CPU 110 receive the migration signals, the migratable tasks mA~mC terminate current operations and alter to a migratable state; the migration agent unit 113 of the low-power CPU 110 further updates the task control block (TCB) of those migratable tasks, puts the migratable tasks into the migration task list 410, and flushes flash memory if required, etc.

Hence, in Step S640, the event queue 160 sends out hardware interrupts, and the ISR sends informative signals or events to the migration agent unit 133 of the high-power CPU 130, to inform that the migration events are awaiting to be processed; in addition, the access control of the shared memory 140 is transferred from the low-power CPU 110 to the high-power CPU 130.

In Step S650, when the migration agent 133 of the high-power CPU 130 receives the migration events, it retrieves the migration tasks from the migration task list 410, and then adds the migratable tasks mA~mC into the run queue 131 of the high-power CPU 130, sets up the related shared interrupts and hardware IPs; and, the RTOS 135 of the high-power CPU 130 performs scheduling, to execute the migratable tasks mA~mC.

Likewise, the process flow of the tasks migrated from the high-power CPU 130 to the low-power CPU 110 are similar and detail descriptions are omitted herein.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A multi-CPU domain mobile electronic device, comprising:
    a first CPU domain, comprising:
        a first migration agent unit;
        a first run queue; and
        a low efficiency low power CPU;
    wherein the first migration agent unit detects a task migration condition, and determines whether to migrate a migratable task;
    a second CPU domain, comprising:
        a second migration agent unit;
        a second run queue; and
        a high efficiency high power CPU;
    a set of common hardware resources, shared by both the first CPU domain and the second CPU domain, comprising: a shared memory, a set of shared interrupts, a set of programmed processing blocks, and an event queue;
    wherein when the first task migration agent unit determines to migrate the migratable task from the first CPU domain to the second CPU domain, the first task migration unit performs the following steps:
        waking up the second CPU domain from a power-saving mode, comprising:
            waking the high efficiency high power CPU;
            making the second migration agent unit operate under a normal operating mode; and
            making the second run queue operate under a normal operating mode;
        sending out a migration signal to the migratable task for informing that the migratable task is to be migrated to the second CPU domain, wherein a status of the migratable task after receiving the migration signal is altered to a migratable state;
        updating a task control block (TCB) of the migratable task;
        putting the migratable task to a migration task list;
        sending out the migration event to the event queue;
        migrating migratable tasks from the first run queue to the shared memory; and
        informing the second migration agent unit by an interrupt service routine (ISR) that the migration event is awaiting to be executed;
    wherein the migratable task is executed by the second CPU domain after the second migration agent unit receives the migration event.

2. The multi-CPU domain mobile electronic device of claim 1, wherein the task migration condition associates with a current CPU load, a task loading, a battery capacity, or a CPU temperature.

3. The multi-CPU domain mobile electronic device of claim 1, wherein the electronic device further comprises:
    the first CPU domain further comprises a first real-time operating system (RTOS); and
    the second CPU domain further comprises a second real-time operating system (RTOS);
    wherein the first RTOS and the second RTOS are homogeneous.

4. The multi-CPU domain mobile electronic device of claim 3, wherein the first migration unit further removes the migratable task from the first run queue, and sends the migratable task to the event queue.

5. The multi-CPU domain mobile electronic device of claim 4, wherein
    the event queue sends out a hardware interrupt;
    the interrupt service routine (ISR) sends out an informative signal to the second migration agent unit, to inform that the migration event is awaiting to be processed; and
    an access control of the shared memory is transferred from the first CPU domain to the second CPU domain.

6. The multi-CPU domain mobile electronic device of claim 5, wherein the second migration agent unit acquires the migratable task from the migration task list, and adds the migratable task to the second run queue; and the second RTOS performs scheduling for executing the migrated migratable task.

7. The multi-CPU domain mobile electronic device of claim 1, wherein power consumption and performance of the first CPU domain is different from that of the second CPU domain.

8. The multi-CPU domain mobile electronic device of claim 1, wherein the first CPU domain having lower power consumption and performance between the first CPU domain and the second CPU domain, and the second CPU domain having higher power consumption and performance between the first CPU domain and the second CPU domain;

when the mobile electronic device executes a low-loading task, the task is first executed by the first CPU domain;

when the mobile electronic device executes a high-loading task, the task is migrated from the first CPU domain to the second CPU domain; and if a task load of the second CPU domain reduces to a degree that the first CPU domain meets, the task is migrated from the second CPU domain to the first CPU domain, and the second CPU domain enters into a power-saving mode to save power consumption.

9. The multi-CPU domain mobile electronic device of claim 1, wherein when the migratable task is created, the migratable task is stored in the shared memory; and the first migration agent unit and the second migration agent unit manage assignment of the migratable task.

10. A multi-CPU domain mobile electronic device operation method, comprising:

providing a low efficiency low power CPU, a first run queue, and a first task migration agent unit in a first CPU domain;

providing a high efficiency high power CPU, a second run queue, and a second task migration agent unit in a second CPU domain;

providing a set of common hardware resources, shared by both the first CPU domain and the second CPU domain, comprising: a shared memory, a set of shared interrupts, a set of programmed processing blocks, and an event queue;

detecting a task migration condition by the first task migration agent unit;

deciding to migrate migratable tasks from a first CPU domain to a second CPU domain by the first task migration agent unit;

sending out a migration signal to the migratable task for informing that the migratable task is to be migrated to the second CPU domain, wherein a status of the migratable task after receiving the migration signal is altered to a migratable state;

updating a task control block (TCB) of the migratable task;

putting the migratable task to a migration task list;

sending out the migration event from the first migration agent unit to the event queue when the first migration agent unit decides to migrate migratable task;

migrating migratable tasks from the first run queue to the shared memory;

waking up the second CPU domain from a power-saving mode and informing the second migration agent unit by an interrupt service routine (ISR) from the first migration agent unit that the migration events are awaiting to be executed;

performing access control of the shared memory based on the migration event; and executing the migratable task by the second CPU domain after the second migration agent unit receives the migration event.

* * * * *